United States Patent [19]

Smith

[11] Patent Number: 4,666,403

[45] Date of Patent: May 19, 1987

[54] AIR PREHEATING SYSTEM FOR CONTINUOUS FIRED FURNACE

[75] Inventor: Daniel P. Smith, Worcester, Mass.

[73] Assignee: Morgan Construction Company, Worcester, Mass.

[21] Appl. No.: 893,819

[22] Filed: Aug. 6, 1986

[51] Int. Cl.[4] .......................... C21B 9/12; F16K 11/00

[52] U.S. Cl. .......................................... 432/54; 432/40; 432/181; 432/30; 432/180

[58] Field of Search ..................... 432/179.29, 180, 30, 432/181, 223, 54, 40; 137/309

[56] References Cited

U.S. PATENT DOCUMENTS

| | | | |
|---|---|---|---|
| 1,739,973 | 12/1929 | Mambourg | 432/181 |
| 1,853,409 | 4/1932 | Edgar | 432/180 |
| 2,601,979 | 7/1952 | Rice et al. | 432/40 |
| 3,170,679 | 2/1965 | Keefer | 432/54 |
| 3,184,223 | 5/1965 | Webber | 432/54 |
| 3,207,493 | 9/1965 | Swain | 432/180 |
| 3,223,135 | 12/1965 | Webber | 432/54 |
| 3,918,890 | 11/1975 | Blaine | 432/181 |
| 4,060,913 | 12/1977 | Yoshida et al. | 432/40 |
| 4,522,588 | 6/1985 | Todd et al. | 432/181 |

*Primary Examiner*—Henry C. Yuen

*Attorney, Agent, or Firm*—Thompson, Birch, Gauthier & Samuels

[57] ABSTRACT

A system for preheating air being fed to a continuous fired furnace by means of high temperature waste gases exhausted from the furnace. The system includes two pairs of interconnected regenerators. The regenerators of one pair are alternately connected by means of a reversing valve to an ambient air inlet and a waste gas exhaust stack, and the regenerators of the other pair are alternately connected by means of a second reversing valve to the furnace's waste gas outlet duct and combustion air inlet duct.

2 Claims, 1 Drawing Figure

AIR PREHEATING SYSTEM FOR CONTINUOUS FIRED FURNACE

BACKGROUND OF THE INVENTION

1. Field of the Invention

This invention relates to a system for preheating combustion gas being fed to a continuous fired furnace by means of the high temperature waste gases being exhausted from the furnace.

2. Description of the Prior Art

Continuous fired furnaces, such as for example the unit melter type of glass furnace, are not designed with an integral primary regenerator. Such furnaces normally employ radiation recuperators to preheat combustion air. However, when applied to gas furnaces, radiation recuperators have not proven to be very consistent in performance over extended periods. Moreover, radiation recuperators are only capable of achieving relatively low air preheat temperatures in the range of 800°-900° F.

SUMMARY OF THE INVENTION

Primary objectives of the present invention include the provision of a system for preheating combustion air for a continuous fired system which is capable of reliable and consistent performance over extended periods, while at the same time achieving significantly higher preheat temperatures on the order of 1500°-1600° F.

These objectives are achieved by employing two pairs of interconnected regenerators, the regenerators of one pair being alternately connected by means of a reversing valve to an ambient air inlet and a waste gas exhaust stack, and the regenerators of the other pair being alternately connected by a second reversing valve to the furnace's waste gas outlet and preheated combustion air inlet. By appropriately adjusting the reversing valves, a continuous flow of preheated combustion air is reliably supplied to the furnace, with the consecutive preheat stages in the first and second regenerators achieving higher temperatures than have heretofore been possible with conventional radiation recuperators.

BRIEF DESCRIPTION OF THE DRAWING

The single drawing is a diagrammatic illustration of a system in accordance with the present invention, with some of the system components being either partially or fully sectioned.

DETAILED DESCRIPTION OF ILLUSTRATED EMBODIMENT

Figure 1:
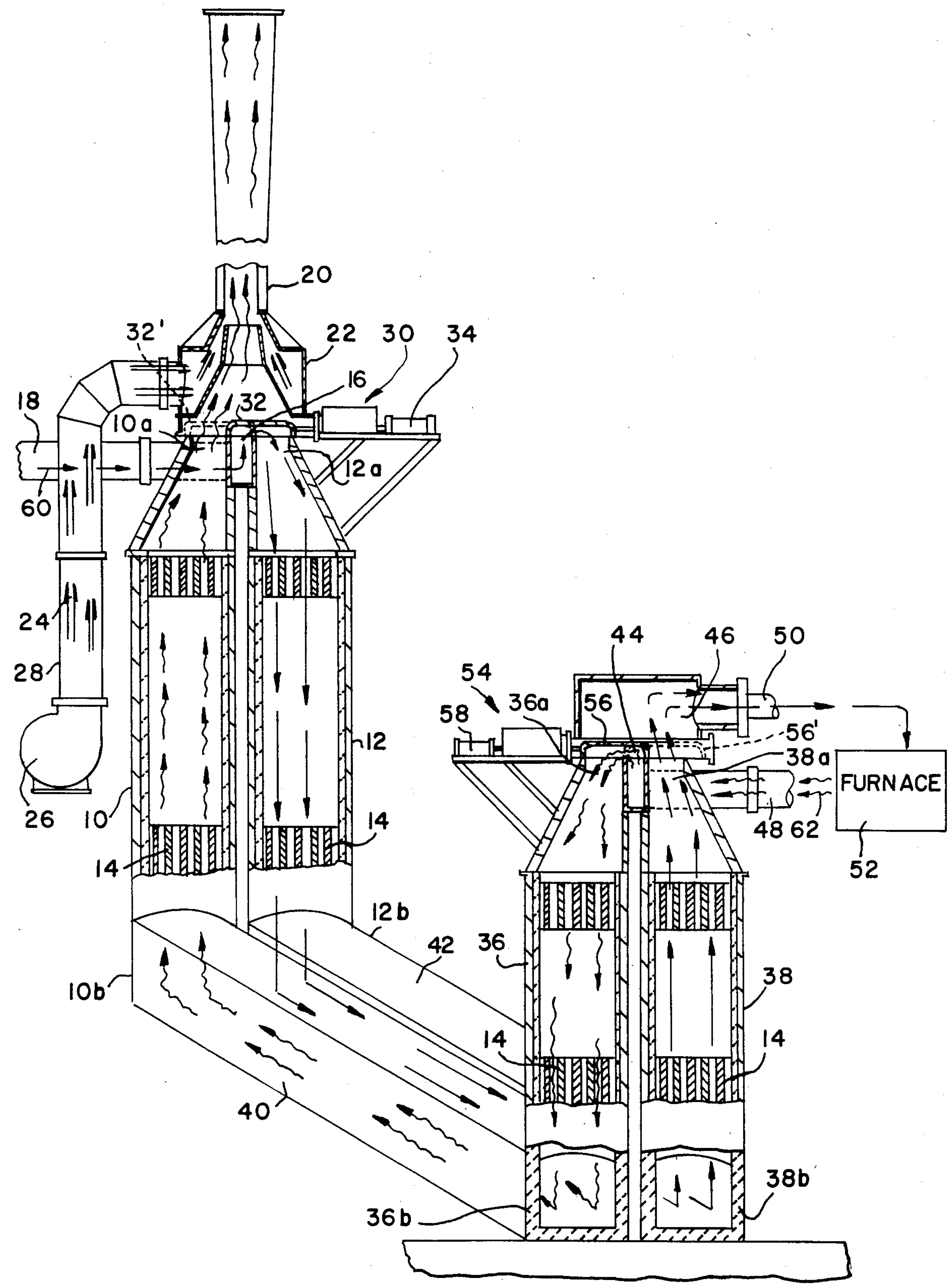

With reference to the drawing, a system in accordance with the present invention is shown comprising a pair of parallel vertically extending first regenerators 10,12, each having an upper end 10*a*,12*a* and a lower end 10*b*,12*b*. The regenerators 10,12 are of standard construction, employing internal regenerator checker packing generally indicated at 14. An ambient air inlet port 16 is located adjacent to and preferably between the upper regenerator ends 10*a*,12*a*. The port 16 is fed by a conduit 18 leading to a standard motor driven fan (not shown).

A waste gas exhaust stack 20 is also located adjacent to and in communication with the upper regenerator ends 10*a*, 12*a*. An ejector 22 fed by a flow of high pressure air indicated schematically at 24 received from fan

26 via conduit 28 serves to draw the combustion gases up and out through the stack 20.

A first reversing valve 30 is arranged at the upper ends 10*a*,12*a* of the first regenerators. The reversing valve is of the known "turtle back" design, having a shell 32 suitably dimensioned and configured to overlie the ambient air inlet port 16 and one of the regenerator upper ends 10*a* ,12*a*, while allowing the other upper regenerator end to remain in communication with the ejector 22 and exhaust stack 20. A single externally arranged pneumatic cylinder 34 is employed to adjust the shell 32 between one position as shown by the solid lines in the drawing, and another position depicted by the broken lines at 32′.

The system further includes another pair of parallel vertically extending second regenerators 36,38 which also have upper ends 36*a*,38*a* and lower ends 36*b*,38*b*. Horizontal conduits ducts 40,42 extend between the first and second regenerators. Duct 40 provides a connection between the lower regenerator ends 10*b* and 36*b*, and duct 42 similarly interconnects the lower regenerator ends 12*b* and 38*b*.

A waste gas inlet 44 and a preheated combustion air outlet 46 are arranged adjacent to the upper ends 36*a*,38*a* of the second regenerators. The waste gas inlet 44 and preheated combustion air inlet 46 are connected respectively by conduits 48,50 to a continuous fired furnace 52.

A second reversing valve 54 is arranged at the upper ends 36*a*,38*a* of the second regenerators. The second reversing valve is essentially identical in construction and operation to the previously described first reversing valve 30, i.e., it too has a shell 56 adjustable by means of a single externally arranged pneumatic cylinder 58 between one position shown by the solid lines in the drawing, and another position depicted by the broken lines at 56′.

With the valves 30,54 adjusted to the positions shown by the solid lines in the drawing, an ambient air flow 60 is driven through inlet port 16, under valve shell 32 and down into the regenerator 12 through its upper end 12*a*. While passing downwardly through regenerator 12, the air experiences a first preheating stage as a result of its exposure to the previously heated packing 14. The air then passes through conduit 42, and up through regenerator 38 where it experiences a second preheating stage before eventually passing through inlet 46 and conduit 50 to the furnace 52. Simultaneously, high temperature waste gases 62 exiting from the furnace via conduit 48 pass through inlet port 44 under valve shell 56 and down into the second regenerator 36. Here, the waste gases experience a first cooling stage as heat is given off to the regenerator packing 14. The waste gases then continue through conduit 40 and up through regenerator 10 where a second cooling stage is experienced before the waste gases finally exit the uncovered upper regenerator end 10*a*. From here, under the influence of the ejector 22, the waste gases are drawn up and out through the stack 20.

Reverse adjustment of the valve shells 32, 56 to the positions indicated by broken lines at 32′ and 56′ will effect a switching of the air and waste gas flows, i.e., the incoming ambient air will experience two stage heating in regenerators 10 and 36 while the outgoing waste gases experience two stage cooling in regenerators 38 and 12.

The regenerators and the reversing valves associated therewith are capable of extended reliable operation with minimum maintenance. A continuous flow of combustion air is supplied to the furnace. Significantly higher preheat temperatures on the order of 1500°-1600° F. as a result of the more efficient transfer of heat from the waste gases to the combustion air.

I claim:

1. A system for preheating combustion air being fed to a continuous fired furnace by means of the high temperature waste gases being exhausted from said furnace, said system comprising:

a pair of parallel vertically extending first regenerators, each having upper and lower ends, an ambient air inlet and a waste gas exhaust stack adjacent to the upper ends of said first regenerators, a first reversing valve arranged at the upper ends of said first regenerators, said first reversing valve being alternately adjustable to connect said ambient air inlet with either one of the upper ends of said first regenerators while simultaneously connecting the upper end of the other of said first regenerators to said exhaust stack, a pair of parallel vertically extending second regenerators, each having upper and lower ends, conduit means for connecting the lower ends of said first regenerators to the lower ends of said second regenerators, a waste gas inlet and a preheated combustion air outlet arranged adjacent to the upper ends of said second regenerators, and a second reversing valve arranged at the upper ends of said second regenerators, said second reversing valve being alternately adjustable to connect said waste gas inlet with either one of the upper ends of said second regenerators while simultaneously connecting the upper end of the other of said second regenerators to said preheated combustion air outlet.

2. The system of claim 1 further comprising ejection means for inducing a draft in said waste gas exhaust stack.

* * * * *